US007114419B2

(12) United States Patent
Liess

(10) Patent No.: US 7,114,419 B2
(45) Date of Patent: Oct. 3, 2006

(54) METHOD FOR PRODUCING DECORATIONS ON AN OBJECT AND RESULTING OBJECT

(76) Inventor: Eric Liess, 5a, rue de la Gare, F-67840 Kilstett (FR)

( * ) Notice: Subject to any disclaimer, the term of this patent is extended or adjusted under 35 U.S.C. 154(b) by 133 days.

(21) Appl. No.: 10/296,787

(22) PCT Filed: May 31, 2001

(86) PCT No.: PCT/FR01/01692

§ 371 (c)(1),
(2), (4) Date: Jan. 17, 2003

(87) PCT Pub. No.: WO01/92036

PCT Pub. Date: Dec. 6, 2001

(65) Prior Publication Data

US 2003/0150521 A1 Aug. 14, 2003

(30) Foreign Application Priority Data

May 31, 2000 (FR) .................................. 00 08995

(51) Int. Cl.
*B23B 3/00* (2006.01)

(52) U.S. Cl. ....................................... 82/1.11; 473/564

(58) Field of Classification Search ................. 82/1.11; 142/56; 473/564, 565, 566, 567, 568
See application file for complete search history.

(56) References Cited

U.S. PATENT DOCUMENTS 1,994,204 A 3/1935 Walls
3,963,589 A * 6/1976 Kushida et al. ............. 205/206
5,127,452 A * 7/1992 Wilston ....................... 142/40
5,747,177 A * 5/1998 Torimoto et al. ........ 428/537.1
5,800,293 A * 9/1998 MacKay, Jr. ................ 473/464
6,058,988 A * 5/2000 Hardesty ................. 144/135.2
6,146,252 A * 11/2000 Martensson .................. 451/44

FOREIGN PATENT DOCUMENTS

DE 31 42 446 A 5/1983
FR 2411680 A 7/1979
FR 2700500 A 7/1994

* cited by examiner

*Primary Examiner*—Willmon Fridie, Jr.
(74) *Attorney, Agent, or Firm*—Egbert Law Offices

(57) ABSTRACT

The invention concerns a method for producing decorations on an object by machining a multilayer structure (1) which consists in machining at various depths a complex consisting of an assembly of materials which are different in particular in shade and/or colour, the multilayer structure (1) being made up of an arrangement of bars (2) with polygonal cross-section, and varied shades and/or colours. The method consists in machining said multilayer structure (1) with one or several turning processes.

4 Claims, 1 Drawing Sheet

METHOD FOR PRODUCING DECORATIONS ON AN OBJECT AND RESULTING OBJECT

BACKGROUND OF THE INVENTION (1) Field of the Invention

The present invention relates to a method for producing decorations on an object through machining a complex, and an object obtained through said method.

(2) Description of the Prior Art

There are already known methods for producing decorations on an object through machining a complex formed by assembling different elements, namely made of wood, which consist, in a first stage, of manufacturing such a complex by performing a superposition of layers of elements of different shades and/or colors, and eventually of a varying thickness, then in machining said so obtained complex according to variable depths, in order to cause variable relief patterns and geometrical shapes to appear, depending on the layer or layers involved by the machining and on the way the machining is carried out.

These methods are however limited as regards the decoration effects achieved. They are namely aimed at manufacturing walls, where variable concentric shapes are achieved through varying the machining depth; such a method is disclosed, for example, in FR 2,700,500.

DE 31 42 446 also provides a similar method; in addition, it provides a process consisting in sculpting a cylindrical block comprising concentric layers.

From U.S. Pat. No. 1,994,204 is also known a method for producing mosaics, consisting in manufacturing a block through assembling bars having a rectangular cross-section, then in cutting said block according to a plane non-parallel to those in which said bars are assembled.

SUMMARY OF THE INVENTION

The object of the present invention is to provide a method for producing decorations on an object through machining a complex of the type as above-mentioned, and which allows achieving decoration effects of a novel type.

The method for producing decorations on an object through machining a complex is of the type consisting in carrying out the machining at variable depths of a complex consisting of an assembly of materials that differ from each other namely as regards their shade and/or their color, said complex consisting of an arrangement of bars having a polygonal cross-section and variable shades and/or colors, and it is characterized in that it consists in machining said complex by means of one or several turning operations.

Turning allows achieving highly variable, but homogenous and also symmetric patterns when the complex is properly centered during the turning operation. Less uniform shapes can however be created by causing said complex to be off-center.

According to an additional feature of the process according to the invention, the complex consists of an assembly of bars made of wood of variable species.

By using different and variable species, thus of different shades and even colors, and by assembling them at random or by arranging them in an accurate way, carrying out the turning allows achieving particular geometrical shapes.

According to another additional feature of the process according to the invention, the complex consists of an assembly of bars made out of one or several plastic materials.

The plastic material or materials are used namely for the countless possibilities of varying their colors.

According to another additional feature of the process according to the invention, the complex consists of an assembly of bars made out of materials of various kinds.

It is possible to manufacture a complex from different materials while complying with determined criteria, in order to avoid namely a deterioration of the assembly in the course of time, for example due to different coefficients of expansion. Furthermore, one should avoid mixing hard materials with soft materials, such an assembly being likely not to be capable of being machined in a satisfactorily way.

It should be noted that an interesting esthetical result is achieved by mixing transparent plastic materials with opaque materials such as for example wood.

According to another additional feature of the process according to the invention, the complex consists of an assembly of bars of different transversal dimensions.

It is possibly to vary the transversal dimensions of the bars, provided however that they are arranged without leaving any gap.

According to another additional feature of the process according to the invention, the complex consists of an assembly of bars of different polygonal cross-sections.

The bars do not compulsorily have the same polygonal cross-section, such as a square, rectangular, triangular, hexagonal cross-section; by way of an example, a complex may thus be formed by the arrangement of bars with a square and rectangular cross-section, or with an octagonal and square cross-section.

The advantages and the features of the process according to the invention will clearly appear from the following description, with reference to the attached drawing showing a non-restrictive embodiment of it.

DETAILED DESCRIPTION OF THE PREFERRED EMBODIMENTS

Figure 1:
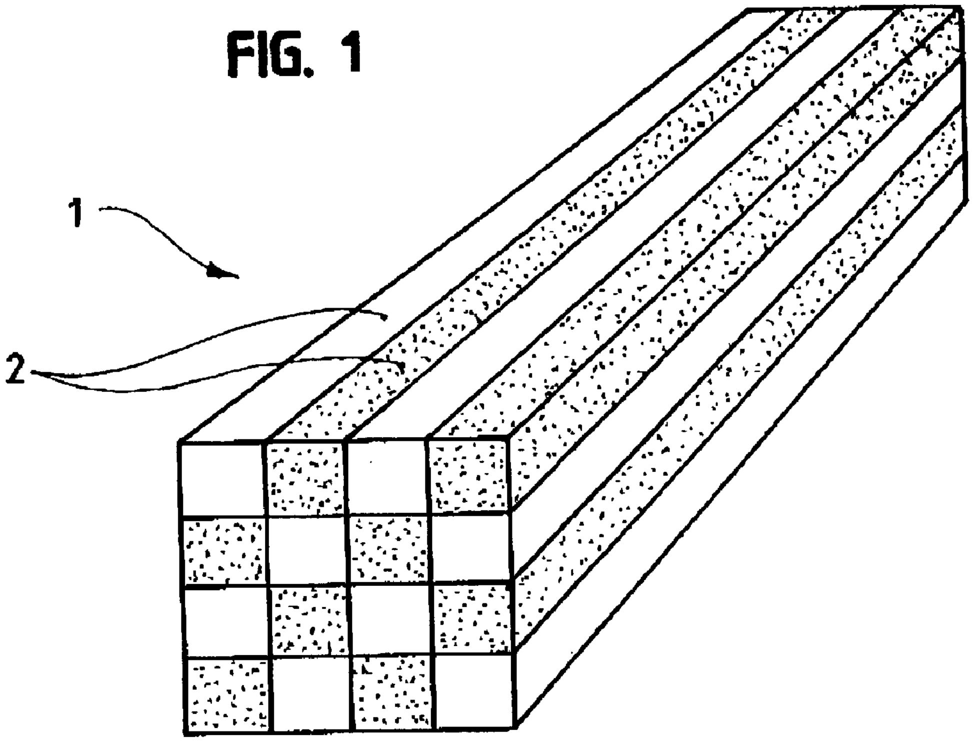
FIG. 1 is a perspective view showing one step of the process for producing decorations on an object through machining according to the invention.

When referring to FIG. 1, one can see a complex 1 produced by assembling bars 2 with a square cross-section, made integral with each other through appropriate means, for example through a gluing operation.

In this embodiment, the bars 2 are of two different shades and are arranged alternately, so as to form lines in the longitudinal direction and a check in cross-section. Of course, many arrangements are possible, by modifying the shades and/or the colors of the bars 2, by modifying the shapes of the bars 2, and through the arrangement of the latter in the complex 1.

Figure 2:
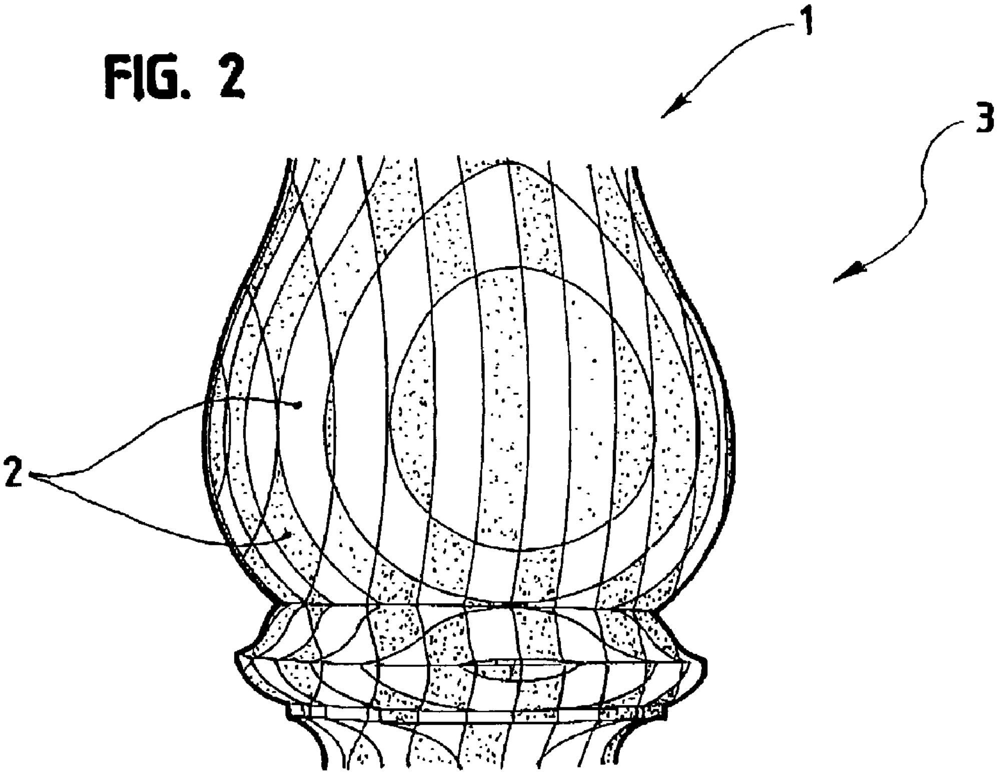
FIG. 2 is a perspective view of a portion of an object produced by means of the process according to the invention.

When referring now to FIG. 2, one can see a portion of an object 3 produced through turning a complex 1 made through arranging identical bars with a square cross-section, but of different shades.

It can be seen that, according to the machining depth, different patterns are achieved. Moreover, turning allows producing, in addition to the rounded shapes that are achieved in a well-known way, symmetrical decorations that have harmonious roundnesses.

It will be understood that, through a different arrangement of the bars 2, i.e. for example a non-symmetric arrangement, it is possible to create patterns with original shapes.

The process according to the invention is aimed at producing numerous objects in the field of furniture, such as, in a non-restrictive way, table and chair feet, lamp stands, etc.

The process according to the invention advantageously allows producing original parts that are different from any other, simply by changing the location of the bars 2 within the complex 1, and/or by changing the machining, whether in shape or in depth.

What is claimed:

1. A method of producing a decorative exterior surface on an object comprising:

assembling a plurality of bars in side-by-side relationship and in bottom-to-top relationship so as to form a generally longitudinal object, said plurality of bars being of similar dimensions and arranged entirely through the longitudinal object, at least some of said plurality of bars being of different shades of color, each of said plurality of bars being of a polygonal cross-sectional, each of said plurality of bars having a thickness dimension substantially equal to a width dimension;

adhering said plurality of bars together; and machining the object at variable depths by at least one turning operation.

2. The method of claim 1, said plurality of bars being of different species of wood.

3. The method of claim 1, said plurality of bars being of a polymeric material.

4. The method of claim 1, said plurality of bars being of different types of material.

* * * * *